United States Patent
Omernick et al.

(10) Patent No.: US 9,043,597 B2
(45) Date of Patent: *May 26, 2015

(54) SYSTEMS AND METHODS FOR VERIFYING THE AUTHENTICITY OF A REMOTE DEVICE

(75) Inventors: Timothy P. Omernick, Mountain View, CA (US); Michael Brouwer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/452,367

(22) Filed: Apr. 20, 2012

(65) Prior Publication Data

US 2012/0210445 A1     Aug. 16, 2012

Related U.S. Application Data

(63) Continuation of application No. 12/135,048, filed on Jun. 6, 2008, now Pat. No. 8,205,081.

(60) Provisional application No. 60/934,084, filed on Jun. 9, 2007.

(51) Int. Cl.
*H04L 9/32*     (2006.01)
*H04W 12/10*     (2009.01)

(52) U.S. Cl.
CPC .......... *H04L 9/3242* (2013.01); *H04L 2209/80* (2013.01); *H04W 12/10* (2013.01)

(58) Field of Classification Search
USPC ......................................... 713/168
See application file for complete search history.

(56) References Cited

U.S. PATENT DOCUMENTS

| | | | |
|---|---|---|---|
| 6,323,846 B1 | 11/2001 | Westerman et al. | |
| 7,895,445 B1 * | 2/2011 | Albanese et al. | 713/185 |
| 8,205,081 B2 * | 6/2012 | Omernick et al. | 713/168 |
| 2002/0019985 A1 * | 2/2002 | Fuccello et al. | 725/133 |
| 2004/0133908 A1 * | 7/2004 | Smith et al. | 725/31 |
| 2005/0015719 A1 * | 1/2005 | Marchon et al. | 715/513 |
| 2005/0086683 A1 * | 4/2005 | Meyerson | 725/30 |
| 2005/0196131 A1 * | 9/2005 | Narusawa et al. | 386/46 |
| 2006/0085862 A1 * | 4/2006 | Witt et al. | 726/26 |
| 2006/0097991 A1 | 5/2006 | Hotelling et al. | |
| 2007/0118849 A1 * | 5/2007 | Kisel et al. | 725/25 |
| 2007/0152983 A1 | 7/2007 | McKillop et al. | |
| 2008/0016156 A1 * | 1/2008 | Miceli et al. | 709/204 |
| 2008/0166968 A1 | 7/2008 | Tang et al. | |

* cited by examiner

*Primary Examiner* — Teshome Hailu

(74) *Attorney, Agent, or Firm* — Downey Brand LLP

(57) ABSTRACT

Some embodiments of the invention are directed to, among other things, systems, computer readable media, methods and any other means for verifying the authenticity of a client device. In some embodiments, a token is issued by one or more remote media servers that allows the client device to download video, media or other data from one or more remote media servers.

25 Claims, 5 Drawing Sheets

SYSTEMS AND METHODS FOR VERIFYING THE AUTHENTICITY OF A REMOTE DEVICE

CROSS REFERENCE TO RELATED APPLICATIONS

This application hereby claims priority under 35 U.S.C. Section 120 to U.S. patent application Ser. No. 12/135,048, entitled "Systems and Methods for Verifying the Authenticity of a Remote Device", filed on Jun. 6, 2008, now U.S. Pat. No. 8,205,081 issued Jun. 19, 2012, and under 35 U.S.C. Section 119(e) to U.S. Provisional Application Ser. No. 60/934,084, entitled "Systems and Methods for Verifying the Authenticity of a Remote Device", filed on 9 Jun. 2007, both contents of which are herein incorporated by reference.

FIELD OF THE INVENTION

The present invention relates generally to client-server authentication protocols. More specifically, the present invention allows a network server to verify that a remote device, which is requesting information and/or media from the server, is authorized to receive information and/or media from the server.

BACKGROUND OF THE INVENTION

Public networks are used as a conduit for passing a variety of data among computers and other electrical devices. Confidential information, protected works of art (e.g., copyrighted music, literature and movies), personal information (e.g., credit card information, social security information, bank accounts, money transfers, etc.) are often exchanged electronically. The sensitivity of some of this data, in conjunction with the nature of the Internet, require systems and methods for securing the transfer of data.

There are a number of secure data transfer protocols that are used today. Some of these protocols verify the authenticity of the device or devices which are receiving and/or providing the sensitive data. However, different types of data, devices and client-server arrangements may require different, more specialized protocols.

One way to verify the authenticity of a remote device and conduct secure transactions over a public network is to use public key encryption, also referred to as asymmetric encryption. Public key encryption is a form of cryptography that allows two entities, such as devices, to securely communicate with each other using public keys and private keys. Each device has its own public key and its own private key. The public key, as its name suggests, is available to any apparatus interested in communicating with the device and is used to encrypt a message. The private key, on the other hand, is kept a secret and is used to decrypt a message.

When using public key encryption algorithms, because the public key is made widely available, it is important to confirm the authenticity of the public key. Additional techniques (such as, for example, message authentication codes and digital signatures) may be used to confirm the authenticity of the public key. Public key encryption, as well as these additional techniques, are widely used today to provide both data origin authentication and/or data integrity.

As effective as public key encryption algorithms are, there are none that are efficient for every intended purpose. Many of the current public key encryption algorithms require, for example, substantial processor bandwidth and do not utilize multiple servers that may be available.

SUMMARY OF THE INVENTION

The present invention can include systems, apparatuses, methods, computer readable media and any other means for verifying the authenticity of a device coupled to a network. Some embodiments of the present invention can comprise allowing a device to verify the authenticity of a remote device before the device provides and/or requests, for example, media content to and/or from the remote device. For example, a client can use the present invention to confirm the authenticity of a server before requesting (or receiving) information from the server or providing information to the server. Likewise, a server can use the present invention to confirm the authenticity of a client before providing information to or requesting (or receiving) information from the client.

The present invention can also include allowing at least two remote devices to be involved in the process of verifying the authenticity of a local, or client device. For example, verifying the authenticity of a client device can include the client communicating and receiving data from a first server, and then communicating at least some of that data to a second server. The first and/or second server(s) can verify the authenticity of the client and/or inform the other server (and/or any other device) that the client is authentic.

A token, for example, can be used to verify the authenticity of the device. The token can be provided to the client device by one or more servers. One or more of the servers can generate the token after receiving data from the client device and/or one or more other servers. As such, the invention can allow a client device, that has limited processing and/or battery power (or that has the power but wants to conserve it), to efficiently and securely interact with a number of servers of a distributed network. Each server on the network, for example, can recognize the token as being valid, which would enable the client device to save power by not having to run the verification protocol each time it communicates with a new server of the distributed network.

The verification protocol can include a number of steps before a token is generated that confirms the authenticity of a client device. For example, the protocol can be initiated by the client device (e.g., iPhone™, Apple TV™, iPod™, computer, or any other device) receiving a user input indicating a desire to view a video (and/or any other type of media) (Apple Inc. owns the trademarks iPhone™, Apple TV™, iPod™.) The user input can be represented by any type of input event and/or signal, such as, for example, a touch event, mouse click, remote control signal, etc. The video (and/or any other type of media) can be stored on at least two remote servers, both of which can be in the same distributed network. As such, the servers can back each other up and have substantially the same or similar media files (and other data) stored on each of the servers.

In response to receiving the user input, the client device can generate a first sequence of bytes, sometimes referred to herein as r1. The sequence of bytes can be provided to, e.g., a first remote server in the distributed network.

In response to receiving r1, the first server can generate a second sequence of bytes, sometimes referred to herein as r2. The second sequence of bytes can be sent to the client device. The client device can also receive a keyed-hash message authentication code (sometimes referred to herein as HMAC) from the first remote server.

In response to receiving r2 and HMAC, the client device can provide the r2 and HMAC to a second remote server in the distributed network. Other data, such as a digital signature, one or more values (which can be functions of r1, r2, a concatenation of r1 and r2, and/or any other data), Identification data, etc., can also be provided to the second remote server (and/or any other server or device).

Subsequent to providing r2, HMAC and/or any other information to the second remote server, the client device can receive the token from the first, second and/or any other remote server or device. The token, which can be provided with, prior to or subsequent to a client request for video (or other media) sent to the server(s), can cause one or more of the servers to grant the request. The client device can than receive the video (or other media) from the remote server. The client device can then facilitate the presentation of the video to the user with a television, integrated display screen, speakers, any other output device and/or component, or combination thereof. The token can be subsequently reused to validate any additional media or information requests (which can based on additional user inputs or automatic system commands). The token, however, can expire, at which point the verification protocol can be repeated and a new token can be generated and issued to the client device.

One skilled in the art would appreciate various other embodiments of the present invention that include, for example, systems, apparatuses, methods, computer readable media and any other means for encrypting and securely transferring data between two or more devices (in addition to or instead of simply verifying the authenticity of one or more devices)

BRIEF DESCRIPTION OF THE DRAWINGS

The above and other features of the present invention, its nature and various advantages will be more apparent upon consideration of the following detailed description of the disclosure, taken in conjunction with the accompanying drawings, in which like reference numerals refer to like parts throughout, and in which.

DETAILED DESCRIPTION OF THE DISCLOSURE

The present invention can include systems, apparatuses, methods, computer readable media and any other means for verifying the authenticity of a device coupled to a network (such as, e.g., the world wide web)

Figure 1:
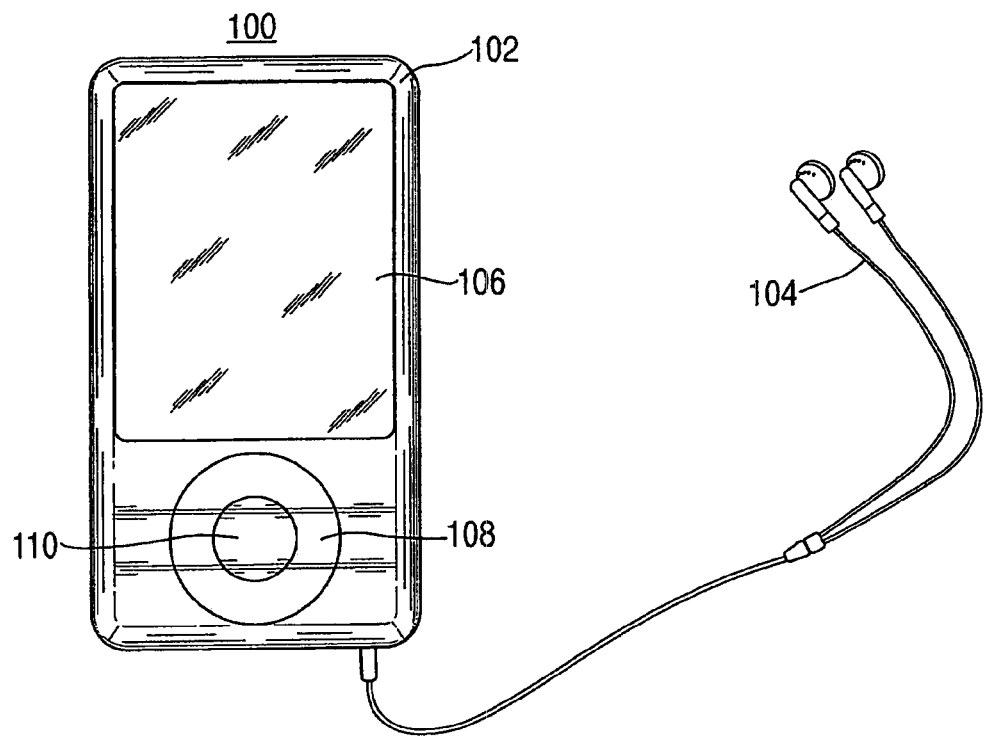
FIGS. 1-2 show exemplary systems in accordance with some embodiments of the present invention.

FIG. 1 shows system 100, which can be operated in accordance with some embodiments of the present invention. System 100 includes handheld device 102 and accessory device 104.

Handheld device 102 can be used to play media (e.g., music, images, video, etc.), generate media (e.g., take pictures, record audio and/or video, etc.), access the Internet, take notes, organize appointments, and/or perform any other function. One or more additional accessory devices 104, such as headphones, can also be included in system 100. Handheld device 102 is illustrated as an iPod™, but one skilled in the art would appreciate that handheld device 102 could be any type of electrical device.

Handheld device 102 includes display component 106. As shown in FIG. 1, display component 106 can be a display screen that is integrated into handheld device 102. Display component 106, like any other component discussed herein, does not have to be integrated into handheld device 102 and can be external to handheld device 102. For example, display component 106 can be a computer monitor, television screen, and/or any other graphical user interface, textual user interface, or combination thereof.

Display component 106 enables handheld device 102 to present displays to a user. The displays can include various types of information and selectable options. For example, a display can include media or information about media that is being played back or can be played back. The displays can also include information downloaded from the Internet (and in some instances, after device 102 has been verified by the server providing the information), contact information, map information or any other type of information. The information can be interactive and responsive to user inputs. In addition, the displays presented by display component 106 can include selectable options that allow a user to navigate the menu hierarchy and utilize the features implemented by handheld device 102.

User input component 108 is illustrated in FIG. 1 as a click wheel. User input component 108 (in combination with its driver circuitry, discussed below) can be used to convert one or more touch inputs into electrical signals, which can cause handheld device 102 to generate and execute one or more executable commands. The center portion of input component 108 can be button 110. Button 110 can be pressure sensitive, touch sensitive, a proximity sensor, any other type of button or input component, or any combination thereof. For example, user input component 108 can be used to control handheld device 102, interact with the menu hierarchy implemented on handheld device 102, select media for downloading and/or instruct handheld device 102 to perform any function it is configured to perform.

One skilled in the art would appreciate that user input component 108 could be any type of user input device that receives a user input and, in response, facilitates the creation of one or more corresponding electrical signals. One skilled in the art would also appreciate that user input component 108 can be integrated into or located external to handheld device 102. For example, user input component 108 could also be, or include, at least one mouse, keyboard, trackball, slider bar, switch, button (such as button 110), number pad, dial, or any combination thereof.

Another example of a user interface component is a multi-touch display screen such as that discussed below in connection with, e.g., FIG. 2 and described in commonly assigned Westerman et al., U.S. Pat. No. 6,323,846, issued Nov. 27, 2001, entitled "Method and Apparatus for Integrating Manual Input", which is incorporated by reference herein in its entirety. User input component 108 may emulate a rotary phone or a multi-button electrical device pad, which may be implemented on a touch screen or the combination of a click wheel or other user input device and a screen. A more detailed discussion of such a rotary phone interface may be found, for example, in McKillop et al., U.S. Pub. 20070152983 entitled "Touch Pad with Symbols based on Mode," which is incorporated by reference herein in its entirety.

In other embodiments, one or more additional accessory devices can be used with handheld device 102. For example, in addition to or instead of accessory device 104, a wireless headset or Apple TV can also be wirelessly coupled to handheld device 102. Handheld device 102 and one or more accessory devices could exchange information using any protocol (such as, e.g., a 802.11 protocol and/or BlueTooth™). If using BlueTooth™, the devices could pair together automatically. Automatic BlueTooth™ pairing is discussed in more detail in commonly assigned Tang et al., U.S. patent application Ser. No. 11/823,923, filed Jun. 28, 2007, entitled "Apparatuses and Methods that Facilitate the Transfer of Power and Information Among Electrical Devices", now U.S. Pat. No. 8,401,473 issued Mar. 19, 2013, which is incorporated by reference herein in its entirety.

Accessory device 104 can operate automatically after successfully executing the proper handshaking protocols, in response to it being coupled to handheld device 102 or in response to one or more user input(s). For example, accessory device 104 may not have its own power supply or input components and only function when it is coupled to handheld device 102. As another example, specialized circuitry or applications (for example, an online video playback feature) can be included in an accessory device (such as an Apple TV) and not in handheld device 102. One skilled in the art would also appreciate that handheld device 102 can be any electrical device, even devices that are not handheld (e.g., laptop computer) or portable (e.g., desktop computer, television, wireless router, etc.).

Figure 2:
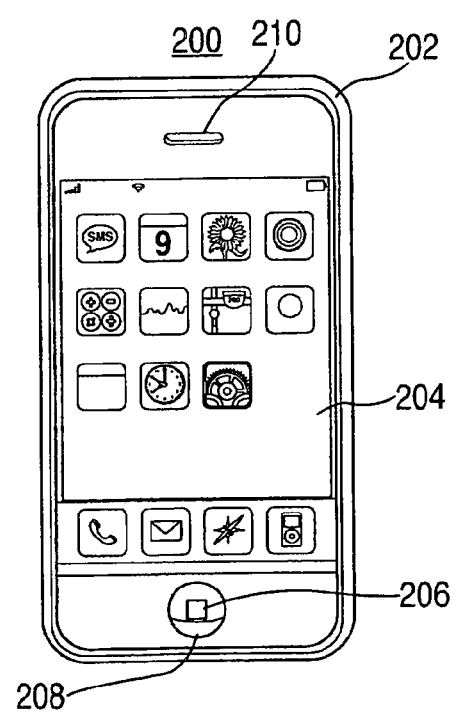

FIG. 2 shows computer system 200 which can also be used in accordance with some embodiments of the present invention. Computer system 200 includes electrical device 202, which is shown in FIG. 2 as an iPhone™. As such, electrical device 202 can function as, among other things, a portable media player, cellular telephone, personal organizer, web browser, camera, and GPS device. One skilled in the art would appreciate that electrical device 202 can be any type of electrical device and be coupled to and used with any type of accessory device without departing from the spirit of the invention.

Electrical device 202 comprises user interface component 204. User interface component 204 is shown in FIG. 2 as a multi-touch screen that can function as both an integrated display screen (the same as or similar to display component 106 described above) and an input device that can receive touch events. Multi-touch display screens are discussed in more detail in commonly assigned U.S. Patent Publication No. U.S. 2006/0097991, entitled "MULTIPOINT TOUCH-SCREEN", now U.S. Pat. No. 7,663,607 issued Feb. 16, 2010, which is incorporated herein by reference in its entirely. Electrical device 202 can also include one or more other user interface components, such as button 206, which can be used to supplement user interface component 204.

Microphone 208 and audio output 210 are respective examples of other input and output components that can be integrated into electrical device 202 or any other device discussed herein. Microphone 208 is preferably a transducer that can capture analog audio signals and convert them into digital signals.

Audio output 210 is shown as being a speaker integrated into electrical device 202, but one skilled in the art would appreciate that audio output 210 may also comprise an external device (such as headphones not shown) and/or one or more connector(s) used to facilitate the playing back of audio content and/or the audio portion of video content.

Figure 3:
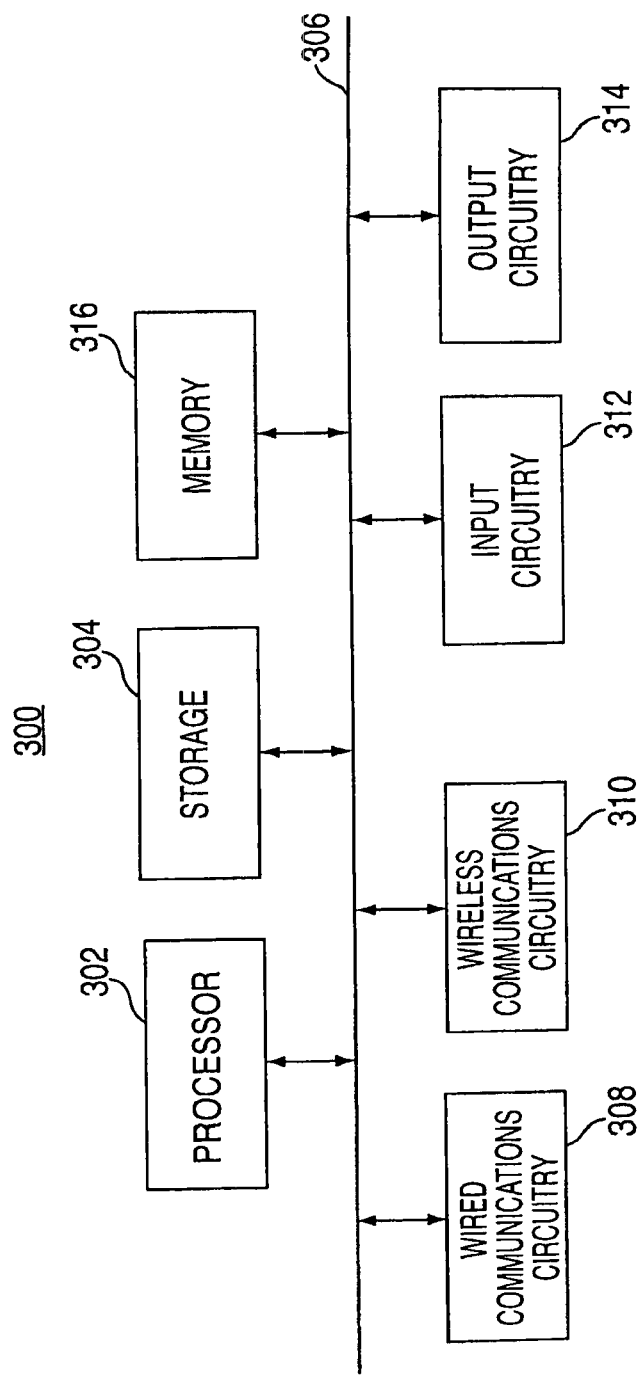
FIG. 3 shows a simplified schematic block diagram of exemplary circuitry incorporated in an apparatus that is in accordance with some embodiments of the present invention.

FIG. 3 shows a simplified schematic diagram of an exemplary electrical device or devices in accordance with some embodiments of the present invention. Apparatus 300 can be implemented in or as any type of electrical device or devices, such as, for example, handheld device 102 and/or electrical device 202 discussed above. In some embodiments, the circuitry of apparatus 300 could be implemented, for example, using a multi-chip module including two or more separate integrated circuits.

Apparatus 300 can be configured to request, receive, store and/or present one or more types of data (e.g., text, video, audio, image, etc.) to a user and/or other device. Data that represents video, images, and/or audio is sometimes referred to herein as media. Additional data, such as descriptive text data associated with media is sometimes referred to herein as metadata. Apparatus 300 can be integrated into or can be any type of portable, fixed, and/or mobile device, including but not limited to a laptop computer, a desktop computer, an audio player (e.g., walkman, compact disc player, etc.), a video player, a media player (e.g., an iPod™ sold by Apple Inc. of Cupertino, Calif., etc.), a television set top box (such as, e.g., an Apple TV™), a portable video game system (e.g., Sony's PSP, Nintendo's Game Boy, etc.), an electronic book, a cellular telephone, a wireless telephone, a hand held computer, a GPS device, a flashlight, a personal digital assistant (PDA) (e.g., Palm Pilot, etc.), a wireless headset for a telephone, a satellite radio, a remote control, an automobile key fob, a printer, an automobile radio, an automobile computing system, a watch, a surge protector, an AC/DC converter, etc., or any combination thereof (such as Apple's iPhone™)

Apparatus 300 can include (but is not limited to) one or more of the following components: processor 302, storage 304, bus 306, wired communications circuitry 308, wireless communications circuitry 310, input circuitry 312, output circuitry 314 and memory 316. One skilled in the art would appreciate that apparatus 300 can also include additional components that are not shown in FIG. 3 (such as, e.g., at least one user input interface, etc.), that the components shown in FIG. 3 could be combined with one another and/or with components that are not shown in FIG. 3, and that the components shown in FIG. 3 can represent one or more components (e.g., wireless communications circuitry 310 can represent the components necessary for WiFi, Bluetooth, and/or cellular telephone communications.

Processor 302 can be configured to control the operation of apparatus 300. For example, processor 302 can control wired communications circuitry 308 and/or wireless communications circuitry 310, thereby enabling apparatus 300 to communicate with one or more other devices (such as, e.g., data servers). These communications can be used to, for example, verify the authenticity of apparatus 300 to one or more servers, verify the authenticity of one or more other devices, receive a direct input (from, e.g., a USB drive) using input circuitry 312, request and receive media from one or more servers, and/or provide data to a display device using output circuitry 314. Processor 302 can, for example, stream data directly from an interface component (e.g., wired communications circuitry 308, wireless communications circuitry 310, input circuitry 312, etc.) to output circuitry 314 and/or store data in storage 304 and/or memory 316.

Storage 304 can be configured to store data, including media, configuration data for apparatus 300, metadata, operating instructions, etc. Storage 304 can be any type of non-volatile storage, including a hard disk device, flash memory, a solid-state drive, etc. For example, media or any other data received from a remote server can be stored on storage 304. The data can then be locally accessed and processed by, e.g., processor 302. Further, configuration information, such as the resolution of a coupled display device or information identifying an associated media server, can be stored on storage 304. Additionally, storage 304 can include operating instructions executed by processor 302 for controlling operation of the apparatus 300. For example, storage 304 can be divided into a plurality of partitions, wherein each partition can be utilized to store one or more types of information and can have custom access control provisions.

Bus 306 couples the components of apparatus 300 together. Bus 306 can be configured to permit unidirectional and/or bidirectional communications between the components of apparatus 300. For example, processor 302 can retrieve information from and transmit information to storage 304 over bus 306. Bus 306 can include, for example, a plurality of buses, each of which couples at least one component of apparatus 300 to another component of apparatus 300 or to a device external to apparatus 300.

The input, output and communications components of apparatus 300 can be used for communicating with other devices, including media servers and presentation devices. Wired communications circuitry 308 and wireless communications circuitry 310 each can be configured to permit apparatus 300 to transmit and receive information over a network, such as a local area network (LAN), the Internet, etc. Additionally, input circuitry 312 can be configured to receive an input from another device through a direct connection, which may be a wired/physical connection (e.g., USB, IEEE 1394, etc.) or wireless connection (e.g., infrared, etc.).

Other types of input interfaces, which are not shown in FIG. 3, may also be implemented in apparatus 300. For example, an input interface may use touch-based operations, near-contact operations, speech-based operations, operations based on tracking a user's eyes or physical presence, any other type of input, or an combination thereof. An input interface, such as a remote control for example, can utilize any type of sensor(s) to generate one or more input signals based on receiving, for example, physical stimuli (e.g., a touch event). In some embodiments, apparatus 300 can include or be coupled to a keyboard and/or one or more other suitable input components (e.g., mouse, trackball, stylus, touch screen, etc.), or any combination thereof. The input components and devices that can be used in conjunction with some embodiments of the present invention are represented in FIG. 3 by input circuitry 312, which can be configured to convert any type of physical stimuli into corresponding electrical (digital and/or analog) signal(s). For example, multi-touch display screens and the corresponding circuitry are discussed in commonly assigned U.S. Patent Publication No. US 2006/0097991, entitled "MULTIPOINT TOUCH-SCREEN", which was incorporated by reference above. One skilled in the art would appreciate that a plurality of input circuitry can be used in connection with the invention and that input circuitry 312 is shown as being singular to avoid over-complicating the drawing.

Apparatus 300 also can comprise output circuitry 314 that can be used to output data and/or information from apparatus 300 to one or more external devices, including, for example, a television, a monitor, an audio receiver, and/or one or more speakers. Output circuitry 314 can be, for example, one or more of an optical audio interface, an RCA connector interface, a component video interface, a High-Definition Multimedia Interface (HDMI), coaxial cable, or any other port(s) used to pass data from apparatus 300 to another device or component. In embodiments, output circuitry 314 can be used to provide a first type of signal, such as an audio stream, to a first device and another type of signal, such as a video stream, to a second device. Output circuitry 314 can also include driver circuitry of at least one integrated or other display screen or device, speaker, telephone ringer, vibration component, any other component or device, or any combination thereof. Like any other component discussed herein, output circuitry 314 may need to be configured, either automatically or manually, and/or require certain software/firmware before being used as discussed herein.

Apparatus 300 also can comprise memory 316, which can be, for example, random access memory (RAM), read only memory (ROM) and/or any other type of data storage device. As with storage 304, a plurality of types of data can be stored in memory 316, including the types of data discussed above as well as, for example, software that is implemented in apparatus 300. One skilled in the art would appreciate that various components of apparatus 300 can be combined or subdivided without departing from the spirit of the present invention. For example, a portion of storage 304 can be allocated to act as memory 316, which may or may not allow memory 316 to be omitted from apparatus 300.

Figure 4:
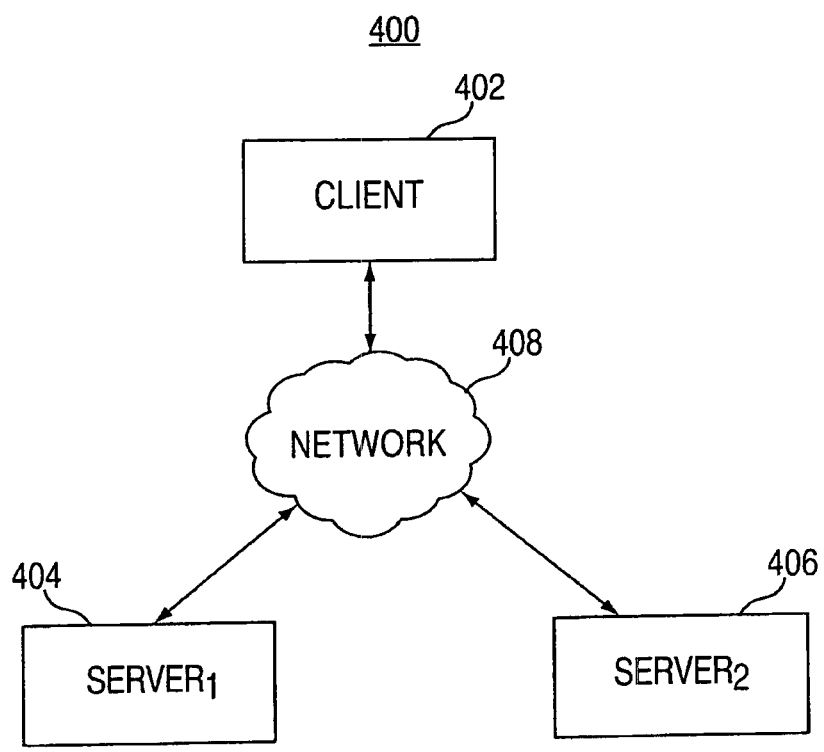
FIG. 4 shows a simplified system that includes an exemplary network of devices in accordance with embodiments of the present invention.

FIG. 4 shows system 400, which includes client 402, first server 404, second server 406 and network 408. Client 402, first server 404 and second server 406 can be any electrical device that are or can be coupled to network 408 (either directly or indirectly). For example, client 402 can be similar to or the same as device 102 (of FIG. 3), electrical device 202 (of FIG. 2), and/or apparatus 300 (of FIG. 3). Client 402 can also act, in some embodiments, as a server.

First server 404 or second server 406 can be, for example, an application server, a communication server, a database server, a proxy server, a file server, a game server, a standalone server, a web server, or any other type of electrical device that can serve data to a client device or other server. In some embodiments, first server 404 and/or second server 406 may serve media to the client device or other server, such as any suitable type of media data (e.g., pictures, graphics, user-generated audio and/or video, professionally-generated audio and/or video, etc.) or metadata described above. First server 404 and second server 406 can also be (but does not have to be) the same/similar type of server and/or provide the same/similar data to a client. For example, both first server 404 and second server 406 can be used to provide the same media to one or more client devices. In some embodiments, first and second servers 404 and 406 can be part of one or more stateless server networks.

Network 408 can be any type of network, such as for example, a client-server network or a peer-to-peer network. Network 408 can comprise, for example, one or more wired connections, wireless connections, or any combination thereof. For example, network 408 may incorporate one or more LANs, wide area networks (WANs), telecommunication networks (such as those used with mobile telephones and land-line telephones), cable television distribution systems, satellite systems (including, but not limited to, global positioning networks, satellite television, etc.), and/or any other interconnection of electrical devices. Other electrical devices (including other servers and clients) can also be coupled to network 408, but are not shown in FIG. 4 to avoid overcomplicating the drawing.

Although client 402, first server 404 and second server 406 can each operate as both a client and server (thereby allowing network 408 to be a peer-to-peer network), for simplicity, the present invention is discussed herein as client 402 acting as a client when communicating with first server 404 and second server 406. For purposes of illustration, network 408 is discussed herein as being a public network (e.g., the Internet), though one skilled in the art would understand that network 408 may be or include one or more private networks.

Client 402 can request data from first server 404 and/or second server 406 via network 408. Before such a request is made or in response to such a request being made, client 402 (or, in some embodiments, a software application implemented on client 402) can authenticate itself with first server 404 and/or second server 406. For example, before client 402 can receive media data stored on first server 404 and/or second server 406, first server 404 and/or second server 406 can verify at least that client 402 is authorized to receive media data (e.g., using subscription information, device information, network information, etc.) and that client 402 is authentic (i.e., client 402 is not an imposter device posing as client 402). Such a protocol is important to prevent unauthorized distribution of data (such as protected media, personal information, malicious software, etc.) on network 408.

Figure 5:
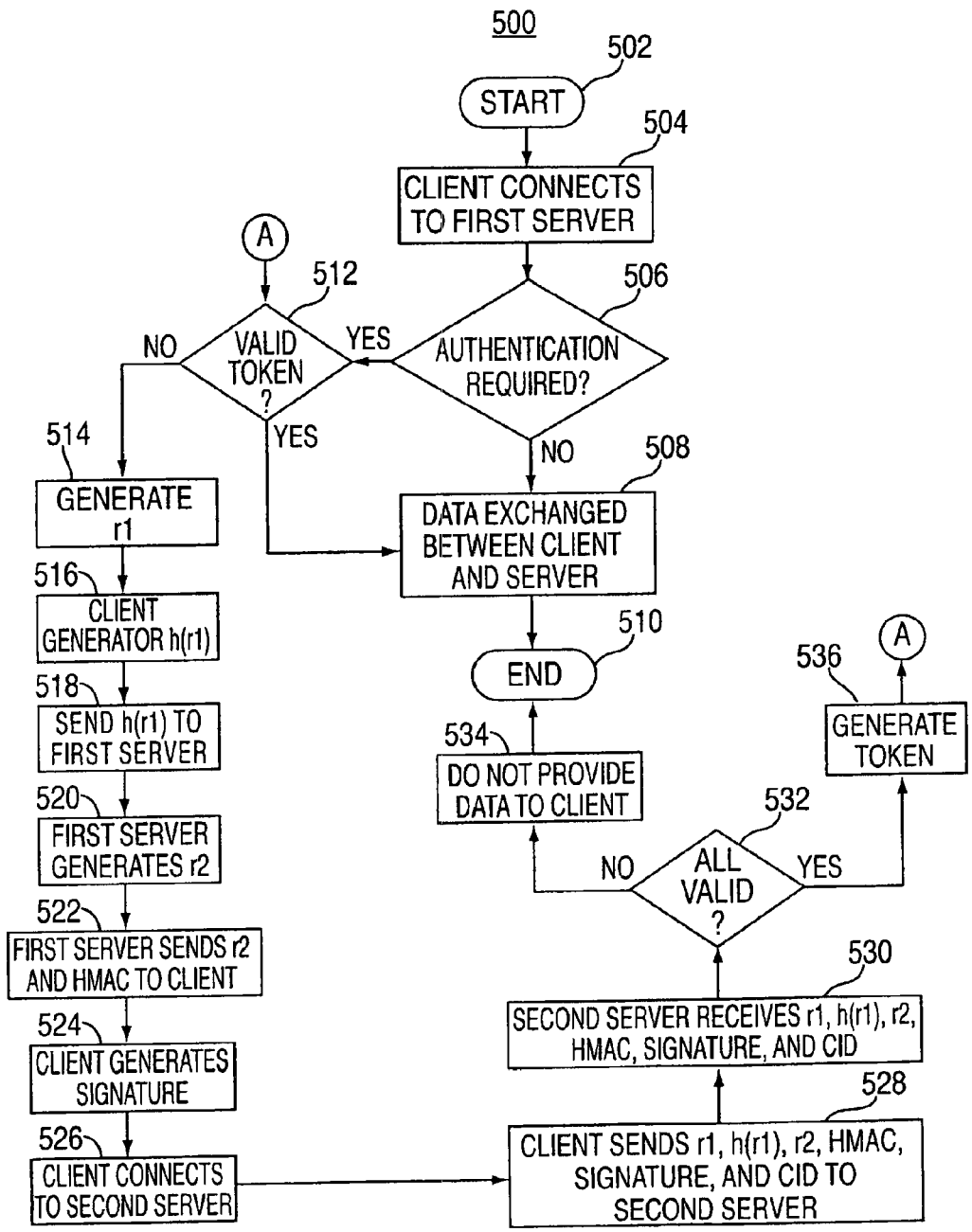
FIG. 5 shows an exemplary process of verifying the authenticity of a remote device in accordance with some embodiments of the present invention.

FIG. 5 shows method 500, which is used by at least two different servers to verify the authenticity of a client device. To avoid overcomplicating the drawing, only one client and two servers are referred to in connection with method 500, but one skilled in the art would appreciate that more than two servers can be used without departing from the spirit of the invention. The client referred to in FIG. 5 can be the same as or similar to client 402 of FIG. 4. Similarly, the servers referred to in FIG. 5 can be the same as or similar to first server 404 and/or second server 406 of FIG. 4.

Method 500 starts at step 502. Step 502 may occur in response or prior to a data request from the client to at least one of the servers. Data requested can include, for example, data in general, a particular type of data, a particular set of data, and/or a particular piece of data. For example, step 502 may not occur when a client device requests metadata from a server, but will occur when the client device requests video data from a server. For example, song listings may be generated and displayed by the client device using metadata it requests and receives from the server, and step 502 may not occur until the media data associated with the selected metadata is requested by the client (e.g., in response to the user selecting to view a movie or song listing that is being displayed by the client)

Next in method 500 is step 504 at which the client connects to a first server and requests data. A network, such as network 408 of FIG. 4 can serve as a conduit between the client and the first server.

Whether or not client/server authentication is required is determined in step 506. As discussed above, authentication can be required in only some instances based on, for example, the type of data being requested, the type of network being used, etc. When authentication is not required, method 500 advances to step 508 at which data is exchanged between the client and the first server and the process ends at step 510.

When client/server authentication is required, method 500 advances to step 512. At step 512, either the first server or the client determines whether or not the client has a valid token. When the client has a valid token, method 500 advances to step 508 (described above). When the client needs to acquire a valid token, method 500 proceeds to step 514.

At step 514, a sequence of bytes (preferably random) can be generated by the client, by other device coupled directly to the client (via an input interface) or by a user. This sequence is referred to herein as r1.

At step 516 the client performs a function on r1. This can generate a value related to r1, referred to herein as h(r1). The function can be, for example, a SHA-1 hash function.

At step 518 the client sends h(r1) to the first server. At step 520 the first server generates or otherwise obtains a sequence of bytes (preferably random), referred to herein as r2.

At step 522 the first server then sends r2 and/or a keyed-hash message authentication code (HMAC) to the client. The HMAC allows the servers to remain stateless so that the client can be re-identified throughout method 500. This is advantageous when, for example, a distributed network environment is being used.

At step 524, the client generates its digital signature. The client's digital signature can be generated using, for example, a first client identifier (referred to herein as $CID^1$) and/or the result of a function, such as the SHA-1 hash function, applied to a concatenation of r2 and r1 (referred to herein as h(r2+r1)). The signature also can be generated using other data. The function used in step 524 can be the same function or a different function as that used in step 516.

Method 500 then proceeds to step 526 at which the client connects to a second server. The second server can be the same server as or a different server than the first server.

At step 528 the client then sends the second server one or more of the following data: r1, h(r1), r2, HMAC, the client's signature, a second client identifier ($CID^2$), or any other type of data. Any of these pieces of data may be sent in the same or different format. In some embodiments, $CID^1$ and $CID^2$ can contain the same identification data or be the same client identifier.

At step 530 the second server receives r1, h(r1), r2, HMAC, the client's signature, and CID2. At step 532, the second server determines whether or not all of these can be verified. When all of these verification items cannot be verified, method 500 advances to step 534 and the requested data is not provided to the client. The process ends at step 510.

In response to all of the verification items being verified at step 532, the client is determined to be authentic and, at step 536, the server generates a token that can be sent to the client. The token can be a string of characters that allows the client to request and/or receive data from one or more servers (such as the first and second server and any other similar server that recognizes and accepts the token). The token can have, for example, an expiration date and/or time and can require the user of the client device to pay a subscription fee. For example, the token can expire (i.e., become invalid) after 24 hours, at which point the client will need to be verified again before the client could request and/or receive data from the server(s) or like servers (e.g., those that require valid tokens)

Method 500 returns to step 512, where it is determined that the client now has a valid token and method 500 proceeds to step 508 (discussed above).

Figure 6:
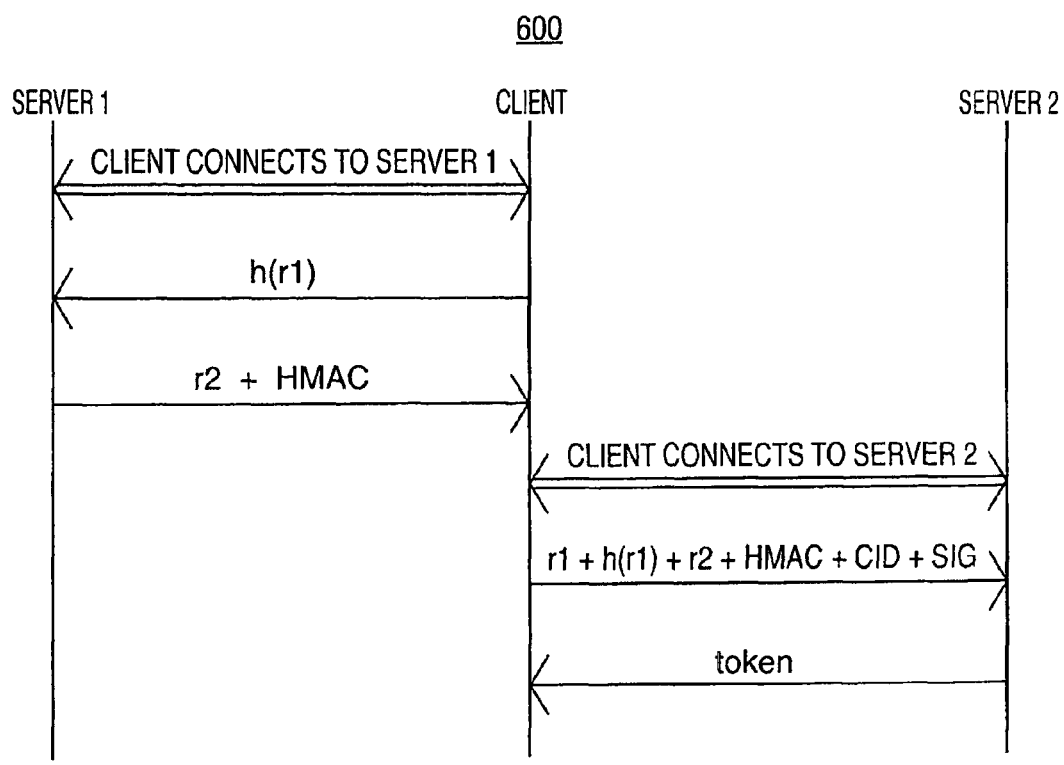
FIG. 6 shows an exemplary flow diagram of a process of verifying the authenticity of a remote device in accordance with some embodiments of the present invention.

FIG. 6 illustrates a simplified flow diagram of the illustrative process 600, which shows the general data exchange between the client of FIG. 5 and the servers of FIG. 5.

The client first connects to the first server and sends h(r1) to the first server. In response, the first server sends r2 and HMAC to the client. The client then connects to the second server. Although the client can connect to the second server prior to or while receiving data from the first server (such as, e.g., when the client connects to the first server).

The client then send r1, h(r1), r2, HMAC, CID and its digital signature to the second server. The second server, as discussed above, validates the data is receives from the client and, if valid, issues a token that the client can use to receive data from a server that recognizes the token.

In some embodiments of the present invention, some or all of the data transmitted among the client and servers may be transmitted using a secure transmission protocol. For example, data may be transmitted over the internet using, e.g., HTTPS. Alternatively, some or all of the data transmitted may be transmitted using an insecure data. Whether data is transmitted securely can depend, for example, on the type of data being transmitted.

One skilled in the art would appreciate other embodiments of the present invention. For example, the first server 404 and/or second server 406 can use the verification protocol (or a slightly modified version) of the present invention to authenticate themselves to the client before particular data is requested or received by the client device. As such, this disclosure is meant to be illustrative and not limiting of various exemplary features that can be used in accordance with and by the present invention.

What is claimed is:

1. A method for authenticating a client device with a system having a first server and a second server, the method comprising:
    at the client device:
        performing a verification procedure, comprising:
            generating a first sequence of bytes;
            sending the first sequence of bytes to the first server;
            receiving a second sequence of bytes from the first server;
            sending the first sequence of bytes and the second sequence of bytes to the second server different than the first server, wherein the second server verifies the client device based on the first sequence of bytes and the second sequence of bytes; and
            receiving a token from the second server, wherein the token is used to authenticate the client device when the client device requests media data from the system.

2. The method as recited in claim 1, further comprising:
    subsequent to performing the verification procedure:
        receiving a request to access the media data;
        in response to receiving the request to access the media data, issuing a request to the system to access the media data, wherein the request to the system includes the token; and
        receiving the media data from the system.

3. The method as recited in claim 2, wherein, when the token is provided with the request to the system, it is not necessary to re-perform a portion of the verification procedure with the system.

4. The method as recited in claim 3, wherein performing the verification procedure further comprises:
    generating a value based on a function that is performed on the first sequence of bytes; and
    sending the value to the second server, wherein the sent value is verified by the second server.

5. The method as recited in claim 1, wherein performing the verification procedure further comprises:
    receiving a keyed-hash message authentication code from the first server; and
    sending the keyed-hash message authentication code to the second server, wherein the sent keyed-hash message authentication code is verified by the second server.

6. The method as recited in claim 1, wherein performing the verification procedure further comprises:
    generating a digital signature based on an identifier associated with the client device; and
    sending the digital signature to the second server, wherein the sent digital signature is verified by the second server.

7. The method as recited in claim 1, wherein performing the verification procedure further comprises:
    generating a value, wherein the value is based on a function that is performed on a concatenation of both the first sequence of bytes and the second sequence of bytes; and
    sending the value to the second server, wherein the sent value is verified by the second server.

8. The method of claim 3, wherein the first sequence of bytes is randomly generated at the client device.

9. The method of claim 1, wherein the token is valid for a finite period of time.

10. The method of claim 9, wherein the verification procedure is performed in response to determining, prior to performing the verification procedure, that the client device is not in possession of a valid token.

11. A method for authenticating a client device with a system having a first server and a second server, the method comprising:
    performing a verification procedure comprising:
        at the first server:
            receiving a first sequence of bytes from the client device, the first sequence of bytes generated at the client device,
            generating a second sequence of bytes based on the first sequence of bytes, and
            sending the second sequence of bytes to the client device; and
        at the second server:
            receiving the first sequence of bytes and the second sequence of bytes from the client device,
            verifying the client device based on the first sequence of bytes and the second sequence of bytes, and
            sending a token to the client device, wherein the token is used to authenticate the client device when the client device requests media data from the system.

12. The method as recited in claim 11, further comprising:
    at the second server:
        receiving a request for media data from the client device;
        determining whether the client device is in possession of a valid token; and
        providing the media data to the client device in response to determining the client device is in possession of the valid token.

13. The method as recited in claim 11, wherein performing the verification procedure is in response to determining, prior to performing the verification procedure that, the client device is not in possession of a valid token.

14. The method as recited in claim 11, wherein performing the verification procedure further comprises:
    at the first server:
        sending a keyed-hash message authentication code to the client device; and
    at the second server:
        receiving the keyed-hash message authentication code from the client device, and
            verifying the client device is further based on the received keyed-hash message authentication code.

15. The method as recited in claim 11, wherein performing the verification procedure further comprises:
    at the second server:
        receiving a value based on both the first sequence of bytes and the second sequence of bytes from the client device and verifying the client device is further based on the received value.

16. A non-transitory computer readable medium configured to store instructions that, when executed by a processor of a client device, cause the client device to perform the steps of:
    generating a first sequence of bytes;
    sending the first sequence of bytes to a first server;
    receiving a second sequence of bytes from the first server;

sending the first sequence of bytes and the second sequence of bytes to a second server, wherein second server verifies the client device based on the first sequence of bytes and the second sequence of bytes; and when the client device is verified by the second server:
receiving a token from the second server;
requesting media data from a system;
providing the token to the system; and
receiving the media data from the system.

17. The non-transitory computer readable medium of claim 16, wherein the steps include:
receiving a keyed-hash message authentication code from the first server.

18. The non-transitory computer readable medium of claim 16, wherein the steps include:
generating a value, wherein the value is based on a function that is performed on a concatenation of both the first sequence of bytes and the second sequence of bytes.

19. The non-transitory computer readable medium of claim 16, wherein the steps include:
generating a digital signature based on an identifier associated with the client device,
and sending the digital signature to the second server.

20. The non-transitory computer readable medium of claim 16, wherein the steps include:
generating verification data based on a result of a function performed on both the first sequence of bytes and the second sequence of bytes.

21. The non-transitory computer readable medium of claim 16, wherein the steps include:
generating verification data using a cryptographic function performed on both the first sequence of bytes and the second sequence of bytes.

22. A system for authenticating a client device using a verification procedure, the system comprising:
a first server configured to perform the steps of:
receiving a first sequence of bytes from the client device, the first sequence of bytes generated at the client device,
generating a second sequence of bytes based on the first sequence of bytes, and
sending the second sequence of bytes to the client device; and
a second server configured to perform the steps of:
receiving the second sequence of bytes from the client device,
verifying the client device based on the first sequence of bytes and the second sequence of bytes, and
sending a token to the client device, wherein the token is used to authenticate the client device when the client device requests media data from the system.

23. The system as recited in claim 22, further comprising:
at the second server:
receiving a request for media data from the client device;
determining whether the client device is in possession of a valid token; and
providing the media data to the client device in response to determining the client device is in possession of the valid token.

24. The system as recited in claim 22, further comprising:
at the first server:
sending a keyed-hash message authentication code to the client device; and
at the second server:
receiving the keyed-hash message authentication code from the client device, and verifying the client device is further based on the received keyed-hash message authentication code.

25. The system as recited in claim 22, further comprising:
at the second server:
receiving a value based on both the first sequence of bytes and the second sequence of bytes from the client device and verifying the client device is further based on the received value.

\* \* \* \* \*